United States Patent
Soyer et al.

(10) Patent No.: US 11,593,646 B2
(45) Date of Patent: Feb. 28, 2023

(54) DISTRIBUTED TRAINING USING ACTOR-CRITIC REINFORCEMENT LEARNING WITH OFF-POLICY CORRECTION FACTORS

(71) Applicant: DeepMind Technologies Limited, London (GB)

(72) Inventors: Hubert Josef Soyer, London (GB); Lasse Espeholt, London (GB); Karen Simonyan, London (GB); Yotam Doron, London (GB); Vlad Firoiu, London (GB); Volodymyr Mnih, London (GB); Koray Kavukcuoglu, London (GB); Remi Munos, London (GB); Thomas Ward, London (GB); Timothy James Alexander Harley, London (GB); Iain Robert Dunning, London (GB)

(73) Assignee: DeepMind Technologies Limited, London (GB)

( * ) Notice: Subject to any disclaimer, the term of this patent is extended or adjusted under 35 U.S.C. 154(b) by 255 days.

(21) Appl. No.: 16/767,049

(22) PCT Filed: Feb. 5, 2019

(86) PCT No.: PCT/EP2019/052692
§ 371 (c)(1),
(2) Date: May 26, 2020

(87) PCT Pub. No.: WO2019/149949
PCT Pub. Date: Aug. 8, 2019

(65) Prior Publication Data
US 2021/0034970 A1 Feb. 4, 2021

Related U.S. Application Data

(60) Provisional application No. 62/626,643, filed on Feb. 5, 2018.

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC ........ G06N 3/08; G06N 3/0454; G06N 3/006; G06N 3/084; G06N 7/005; G06N 3/0445
See application file for complete search history.

(56) References Cited

U.S. PATENT DOCUMENTS 10,445,641 B2 * 10/2019 Srinivasan ............... G06N 3/08
11,132,211 B1 * 9/2021 Tang ..................... B60W 60/00
(Continued)

FOREIGN PATENT DOCUMENTS

| CN | 105637540 | 6/2016 |
| WO | WO 2016/127045 | 8/2016 |

(Continued)

OTHER PUBLICATIONS

Office Action in Japanese Appln. No. 2020-529199, dated Sep. 6, 2021, 5 pages (with English translation).
(Continued)

*Primary Examiner* — Beemnet W Dada
(74) *Attorney, Agent, or Firm* — Fish & Richardson P.C.

(57) ABSTRACT

Methods, systems, and apparatus, including computer programs encoded on a computer storage medium, for training an action selection neural network used to select actions to be performed by an agent interacting with an environment. In one aspect, a system comprises a plurality of actor computing units and a plurality of learner computing units. The actor computing units generate experience tuple trajectories that are used by the learner computing units to update learner action selection neural network parameters using a
(Continued)

reinforcement learning technique. The reinforcement learning technique may be an off-policy actor critic reinforcement learning technique.

23 Claims, 5 Drawing Sheets

(56) References Cited

U.S. PATENT DOCUMENTS

| | | | | |
|---|---|---|---|---|
| 2016/0232445 | A1* | 8/2016 | Srinivasan | G06N 3/0472 |
| 2021/0034970 | A1* | 2/2021 | Soyer | G06N 3/0454 |
| 2021/0158162 | A1* | 5/2021 | Hafner | G06F 30/27 |
| 2022/0188603 | A1* | 6/2022 | Teramae | G06N 3/08 |

FOREIGN PATENT DOCUMENTS

| WO | WO 2017/019555 | 2/2017 |
|---|---|---|
| WO | WO 2017/044842 | 3/2017 |
| WO | WO 2017/083772 | 5/2017 |

OTHER PUBLICATIONS

Chen et al., "Revisiting distributed synchronous SGD," CoRR, Mar. 2017, arXiv:1604.00981v3, 10 pages.

Espeholt et al., "Impala: Scalable Distributed Deep-ROL with Importance Weighted Actor-Learner Architectures," CoRR, https://arxiv.org/abs/1802.01561, Jun. 2018, 22 pages.

Gu et al., "Deep reinforcement learning for robotic manipulation with asynchronous off-policy updates," CoRR, arXiv:1610.00633v2, Nov. 2016, 9 pages.

Mnih et al., "Asynchronous Methods for Deep Reinforcement Learning," CoRR, https://arxiv.org/abs/1602.01783, Jun. 2016, 19 pages.

Nair et al., "Massively Parallel Methods for Deep Reinforcement Learning," CoRR, https://arxiv.org/pdf/1507.04296v2, Jul. 2015, 14 pages.

PCT International Search Report and Written Opinion in International Appln. No. PCT/EP2019/052692, dated Feb. 5, 2019, 17 pages.

PCT Preliminary Report on Patentability in International Appln. No. PCT/EP2019/052692, dated Aug. 11, 2020, 14 pages.

\* cited by examiner

DISTRIBUTED TRAINING USING ACTOR-CRITIC REINFORCEMENT LEARNING WITH OFF-POLICY CORRECTION FACTORS

This application is a National Stage Application under 35 U.S.C. § 371 and claims the benefit of International Application No. PCT/EP2019/052692, filed Feb. 5, 2019, which claims priority to U.S. Application No. 62/626,643, filed Feb. 5, 2018, the disclosure of which is incorporated herein by reference.

BACKGROUND

This specification relates to reinforcement learning.

An agent can interact with an environment by performing actions that are selected in response to receiving observations that characterize the current state of the environment. The action to be performed by the agent in response to receiving a given observation can be determined in accordance with the output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a distributed training system implemented as computer programs on one or more computers in one or more locations that can train an action selection network using off-policy actor-critic reinforcement learning techniques.

According to a first aspect there is provided a method for training an action selection neural network used to select actions to be performed by an agent interacting with an environment. The action selection neural network is configured to process an input including an observation of the environment in accordance with current parameter values of the action selection neural network to generate an output including respective learner policy scores for each action in a predetermined set of actions that can be performed by the agent.

The method may comprise obtaining a sequence of one or more experience tuples where each experience tuple comprises: (i) an observation characterizing a state of an instance of the environment at a respective time step, (ii) an action that was selected to be performed by the agent at the respective time step using a behavior policy, (iii) a behavior policy score assigned to the selected action by the behavior policy when the action was selected, (iv) a subsequent observation characterizing a subsequent state of the environment instance subsequent to the agent performing the selected action, and (iv) a reward received subsequent to the agent performing the selected action. The behavior policy may be a policy used by the action selection neural network when the experience tuple was obtained.

The method may further comprise adjusting current parameter values of a state value neural network, where the state value neural network is configured to process an input including an observation of the environment in accordance with current parameter values of the state value neural network to generate an output including a state value for the observation.

The adjusting may include determining, using the state value neural network, in accordance with current parameter values of the state value neural network, and based on the observation included in the first experience tuple in the sequence, a state value for the observation included in the first experience tuple in the sequence.

The adjusting may further include, for each experience tuple of the sequence of experience tuples: determining, using the action selection neural network, in accordance with current parameter values of the action selection neural network, and based on the observation included in the experience tuple, a learner policy score for the selected action from the experience tuple; determining a trace coefficient based on (dependent upon) a ratio of the learner policy score for the selected action and the behavior policy score for the selected action; determining a correction factor for the experience tuple based on (dependent upon): (i) the trace coefficient for the experience tuple, and (ii) the trace coefficients for any experience tuples that precede the experience tuple in the sequence; and determining a state value temporal difference for the experience tuple; this may represent a difference between the state values of the observation and subsequent observation in the experience tuple, and may be based on at least: (i) the reward included in the experience tuple, (ii) a state value for the observation included in the experience tuple generated by processing the observation included in the experience tuple in accordance with current parameter values of the state value neural network, and (iii) a state value for the subsequent observation included in the experience tuple generated by processing the subsequent observation included in the experience tuple in accordance with current parameter values of the state value neural network.

The adjusting may further include determining a state value target for the observation included in the first experience tuple in the sequence based on at least: (i) the correction factors, (ii) the state value temporal differences, and (iii) the state value for the observation included in the first experience tuple in the sequence; determining a gradient of a state value loss function with respect to parameters of the state value neural network, where the state value loss function is based on at least the state value target; and adjusting the current parameter values of the state value neural network based on the gradient.

The method may further comprise adjusting current parameter values of the action selection neural network based at least on (dependent upon): (i) a ratio of the learner policy score and the behavior policy score for the selected action from the first experience tuple of the sequence, and (ii) state values generated by the state value neural network by processing observations included in one or more experience tuples in accordance with current parameter values of the state value neural network.

Implementations of this method are adapted to implementation on a distributed computing system with multiple actors (actor computing units), potentially thousands of actors, and one or more learners (learner computing units) which implement the method. For example in implementations the actors communicate sequences of experience tuples (trajectories of experience) to a centralized learner, rather than communicating gradients with respect to parameters of a central policy server. However because the policy used to generate a trajectory can lag behind the policy on the learner by several updates at the time of gradient calculation, learning becomes off-policy. The above described method incorporates a trace coefficient which ameliorates this harmful discrepancy. In implementations trajectories of experience generated by the behavior policy may thus be used to learn a value function (state value) for the learner policy, which is different to the behavior policy. Thus implementations of the method are specifically adapted to implementation on a highly distributed computing system, without sacrificing training stability or data efficiency.

Implementations of the method are further adapted to parallelization. For example the learner parameters may be distributed across a distributed set of learners and actors may retrieve the parameters from all the learners in parallel while only sending observations to one learner. This can avoid the bottleneck of a single dedicated processor which might otherwise be a limiting factor during training.

In addition, because in implementations the learner performs updates on entire batches, or sequences of trajectories the learner is able to parallelize operations on these trajectories. For example where the learner comprises a convolutional neural network followed by an LSTM (Long Short-Term Memory) the learner may apply the convolutional network to all inputs in parallel by folding the time dimension into the batch dimension. Similarly the learner may apply a fully-connected output layer following the LSTM to all the time steps in parallel once all LSTM states are computed. This can increase the effective batch size to thousands.

Thus implementations of the method are adapted to a decoupled, distributed architecture, and parallelized operations, and can achieve a very high throughput, for example improving on other techniques by more than an order of magnitude. Implementations of the method are also very data-efficient, that is they may use less data for learning but nonetheless may achieve better final performance. For example implementations of the method, and corresponding systems, may be an order of magnitude more data-efficient than some other techniques, with a consequent reduction in processing power. Some implementations are also robust to choice of hyperparameter values and network architecture.

A still further advantage of implementations of the method, and corresponding systems, is that they are able to learn multiple different tasks in parallel. For example, instead of allocating the same task to all the actors, different actors may be allocated to different tasks, for example a fixed number of actors to each task. The method/system itself does not need to know which task it is being trained or evaluated on.

Thus in some implementations the method may be implemented in a system including a plurality of actor computing units, each of the actor computing units configured to maintain a respective actor action selection neural network and to perform actor operations including generating a trajectory of one or more experience tuples. Generating an experience tuple may comprise receiving an observation characterizing a current state of an instance of the environment. Generating an experience tuple may further comprise determining, using the actor action selection neural network, in accordance with current parameter values of the actor action selection neural network, and based on the observation, a selected action to be performed by the agent and a policy score for the selected action. Generating an experience tuple may further comprise obtaining transition data including: (i) a subsequent observation characterizing a subsequent state of the environment instance subsequent to the agent performing the selected action and (ii) a reward received subsequent to the agent performing the selected action. Generating an experience tuple may further comprise generating an experience tuple from the observation, the selected action, the policy score for the selected action, the subsequent observation, and the reward. The actor operations may further comprise storing the trajectory of experience tuples in a queue, where the queue is accessible to each of the actor computing units, and the queue comprises an ordered sequence of different experience tuple trajectories. The system may further comprise one or more learner computing units. Each of the one or more learner computing units may be configured to perform learner operations defined by the above described method.

In some implementations of the method determining the correction factor for the experience tuple may comprise truncating (limiting) the trace coefficient for the experience tuple at a first truncation value; and truncating the trace coefficients for any experience tuples that precede the experience tuple in the sequence at a second truncation value. In some implementations the first truncation value may control a value function (defining the state value) converged to, e.g. whether it is closer to that of the behavior policy, when the first truncation value is small, or the learner policy; and the second truncation value may control the speed of convergence. In implementations the first truncation value is greater than or equal to the second truncation value. Determining the correction factor for the experience tuple may additionally or alternatively comprise scaling the trace coefficients by a predetermined scaling factor.

In some implementations of the method determining the correction factor for the experience tuple may comprise determining a product of: (i) the trace coefficient for the experience tuple and (ii) the trace coefficients for any experience tuples that precede the experience tuple in the sequence. Determining a state value temporal difference for the experience tuple may comprise adding: (i) the reward included in the experience tuple, (ii) a product of a discount factor and the state value for the subsequent observation included in the experience tuple, and (iii) a negative of the state value for the observation included in the experience tuple. Determining a state value target may comprise determining a discounted sum, over the sequence of experience tuples, of a product of: (i) the correction factor for the experience tuple and (ii) the state value temporal difference for the experience tuple, and adding the state value for the observation included in the first experience tuple to the discounted sum. The state value loss function may comprise, for example, a squared loss between the state value target and the state value for the observation included in the first experience tuple in the sequence.

In some implementations adjusting the current parameter values of the action selection neural network is based on a ratio of the learner policy score and the behavior policy score for the selected action and may comprise truncating the ratio at a predetermined value. In general the behavior policy is different to the learner policy defined by the action selection neural network. In broad terms the more dissimilar the learner policy score is to the behavior policy score, the more off-policy is the method.

In some implementations of the method adjusting the current parameter values of the action selection neural network may be further based on at least a gradient of the learner policy score for the selected action included in the first experience tuple in the sequence; and a state value target for an observation included in a later experience tuple that is after the first experience tuple in the sequence, where the state value target for the observation included in the later experience tuple is based on at least: (i) correction factors for the later experience tuple and subsequent experience tuples, (ii) state value temporal differences for the later experience tuple and subsequent experience tuples, and (iii) a state value for the observation included in the later experience tuple in the sequence; and rewards included in one or more experience tuples of the sequence.

The method may include determining an entropy bonus and adjusting the current parameter values of the action selection neural network further based on at least a gradient of the entropy bonus with respect to parameters of the action selection neural network. This can inhibit premature convergence. Determining the entropy bonus may include determining a sum, over each action of the predetermined set of actions, of a product of: (i) a learner policy score for the action from the action selection neural network based on the observation included in the first experience tuple, and (ii) a logarithm of the learner policy score for the action from the action selection neural network based on the observation included in the first experience tuple.

The above described system, for training e.g. a learner action selection neural network used to select actions to be performed by an agent interacting with an environment, may be implemented in conjunction with or independently of the above described method.

In implementations of the system each learner computing unit may be configured to update a respective proper subset of the learner action selection neural network parameters (a proper subset does not coincide with the set containing it).

Each actor computing unit may performs actor operations further including updating the current parameter values of the actor action selection neural network. These operations may include obtaining current parameter values of the learner action selection neural network, and updating the current parameter values of the actor action selection neural network based on the current learner action selection neural network parameter values. Each actor computing unit, after generating an experience tuple trajectory, may refrain from generating additional experience tuple trajectories before updating the current parameter values of the actor action selection neural network.

In implementations the learner action selection neural network includes one or more convolutional layers. Determining, using the batch of experience tuple trajectories, an update to the learner action selection neural network parameters may comprise processing each observation from each experience tuple of each experience tuple trajectory in the batch using the learner action selection neural network. For each convolutional layer of the learner action selection neural network, the inputs to the convolutional layer for each of the observations may be processed in parallel to generate convolutional layer outputs for each of the observations.

In implementations the learner action selection neural network includes one or more fully-connected layers. Determining, using the batch of experience tuple trajectories, an update to the learner action selection neural network parameters may comprise processing each observation from each experience tuple of each experience tuple trajectory in the batch using the learner action selection neural network. For each fully-connected layer of the learner action selection neural network, the inputs to the fully-connected layer for each of the observations may be processed in parallel to generate fully-connected layer outputs for each of the observations.

In implementations the learner action selection neural network includes one or more long short-term memory layers. Determining, using the batch of experience tuple trajectories, an update to the learner action selection neural network parameters may comprise processing each observation from each experience tuple of each experience tuple trajectory in the batch using the learner action selection neural network. For each long short-term memory layer of the learner action selection neural network, the inputs to the long short-term memory layer for each of the observations may be processed in parallel to generate long short-term memory layer outputs for each of the observations.

Particular embodiments of the subject matter described in this specification can be implemented so as to realize one or more of the following further advantages.

This specification describes a distributed training system for training a learner action selection neural network. The distributed training system includes multiple actor computing units which generate experience tuple trajectories that each characterize the interaction of an agent with an instance of an environment. The actor computing units provide the generated experience tuple trajectories to one or more learner computing units, which use the experience tuple trajectories to train learner action selection networks using reinforcement learning techniques. By separating "acting" (i.e., generating experience tuple trajectories) from learning (i.e., training the learner action selection networks), the distributed training system described in this specification can efficiently use available computational resources (e.g., memory and computing power) to achieve a very high data throughput rate. For example, processing units (e.g., graphics processing units (GPUs) and central processing units (CPUs)) benefit greatly from running a few large, parallelizable operations rather than many small operations. In the distributed training system described in this specification, each learner computing unit can efficiently process batches of experience tuple trajectories in parallel. In contrast, some conventional systems do not separate acting from learning. For example, in some conventional systems, actor computing units may perform both acting and learning operations and transmit action selection network parameter updates to learner computing units (i.e., rather than transmitting experience tuple trajectories, as in the distributed training system described in this specification). Conventional systems which do not separate acting from learning may be unable to use computational resources as efficiently as the distributed training system described in this specification (e.g., by processing batches of experience tuple trajectories in parallel).

In addition to efficiently using computational resources, the distributed training system described in this specification can be scaled to incorporate large numbers of actor and learner computing units. As the distributed training system is scaled to incorporate larger numbers of actor and learner computing units, it can be used to train more complex (e.g., deeper) action selection networks to solve larger collections of tasks.

This specification describes a reinforcement learning system that can use actor-critic reinforcement learning techniques to jointly train an action selection network and a state value network based on off-policy experience tuple trajectories. An experience tuple trajectory is said to be off-policy if the action selection policy used to select the actions included in the experience tuple trajectory is different than the action selection policy defined by the current parameter values of the action selection network being trained. The reinforcement learning system described in this specification uses correction factors to modulate adjustments made to the parameters of the state value neural network and the action selection neural network during training in order to account for the experience data being off-policy. In contrast, some conventional actor-critic reinforcement learning methods rely on on-policy training data. The reinforcement learning system described in this specification may be applicable for use in a broader range of applications than conventional systems which rely on on-policy experience tuple trajectories. For example, the reinforcement learning system described in this specification can be used by the learner computing units of the distributed training system described in this specification to process the potentially off-policy experience tuple trajectories generated by the actor computing units.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a distributed training system and a reinforcement learning system. The distributed training system separates acting from learning by using multiple actor computing units to generate experience tuple trajectories which are processed by one or more learner computing units to train an action selection network. The reinforcement learning system implements an off-policy actor-critic reinforcement learning technique, that is, an actor-critic reinforcement learning technique that can be used to train an action selection network based on off-policy experience tuple trajectories.

Figure 1:
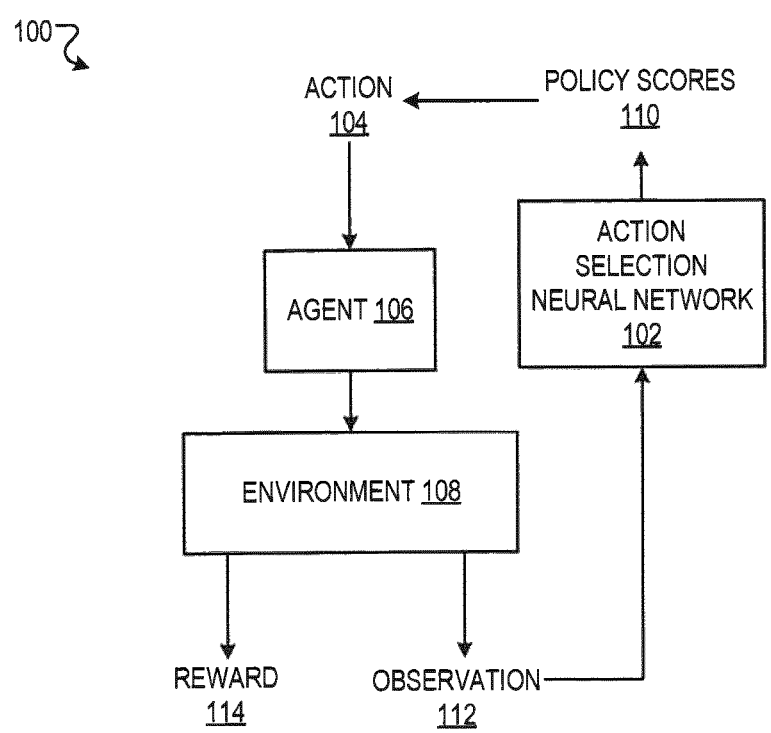
FIG. 1 illustrates an example data flow for using an action selection network to select actions to be performed by an agent interacting with an environment.

FIG. 1 illustrates an example data flow 100 for using an action selection neural network 102 to select actions 104 to be performed by an agent 106 interacting with an environment 108 at each of multiple time steps. At each time step, the action selection network 102 processes data characterizing the current state of the environment 108, e.g., an image of the environment 108, to generate policy scores 110 that are used to select an action 104 to be performed by the agent 106 in response to the received data. Data characterizing a state of the environment 108 will be referred to in this specification as an observation. At each time step, the state of the environment 108 at the time step (as characterized by the observation 112) depends on the state of the environment 108 at the previous time step and the action 104 performed by the agent 106 at the previous time step.

At each time step, the agent 106 may receive a reward 114 based on the current state of the environment 108 and the action 104 of the agent 106 at the time step. In general, the reward 114 is a numerical value. The reward 114 can be based on any event or aspect of the environment. For example, the reward 114 may indicate whether the agent 106 has accomplished a task (e.g., navigating to a target location in the environment 108) or the progress of the agent 106 towards accomplishing a task.

In some implementations, the environment is a real-world environment and the agent is a mechanical agent interacting with the real-world environment. For example, the agent may be a robot interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

Optionally, in any of the above implementations, the observation at any given time step may include data from a previous time step that may be beneficial in characterizing the environment, e.g., the action performed at the previous time step, the reward received at the previous time step, and so on.

The policy scores 110 generated by the action selection network 102 at each time step may include a respective numerical value for each action in a set of possible actions that can be performed by the agent at the time step. The policy scores 110 can be used in any of a variety of ways to determine the action 104 to be performed by the agent 106 at a time step. For example, each policy score 110 may represent a respective probability value for an action in the set of possible actions. The action 104 to be performed by the agent 106 at the time step can be determined by sampling an action in accordance with the probability values for the actions. As another example, the action with the highest policy score 110 may selected as the action to be performed at the time step.

The action selection network 102 can be implemented with any appropriate neural network architecture. In one example, the action selection network 102 may include one or more convolutional layers, followed by one or more fully-connected layers, followed by a recurrent layer (e.g., a long short-term memory (LSTM) recurrent layer). In this example, the action selection network 102 may generate the policy scores 110 at each time step based on the internal state of the recurrent layer at the time step.

The interaction of the agent 106 with the environment 108 over one or more time steps may be represented by a "trajectory" (i.e., sequence) of experience tuples, where each experience tuple corresponds to a respective time step. An experience tuple corresponding to a time step may include: (i) an observation characterizing the state of the environment at the time step, (ii) an action that was selected to be performed by the agent at the time step, (iii) a policy score assigned to the selected action when the action was selected, (iv) a subsequent observation characterizing a subsequent state of the environment subsequent to the agent performing the selected action, and (iv) a reward received subsequent to the agent performing the selected action.

As will be described in more detail with reference to FIG. 2, the action selection neural network can be included in a "learner" or "actor" computing unit of a distributed training system. As will be described in more detail with reference to FIG. 3, the action selection neural network 102 can be trained in tandem with a state value neural network using an off-policy actor-critic reinforcement learning technique.

Figure 2:
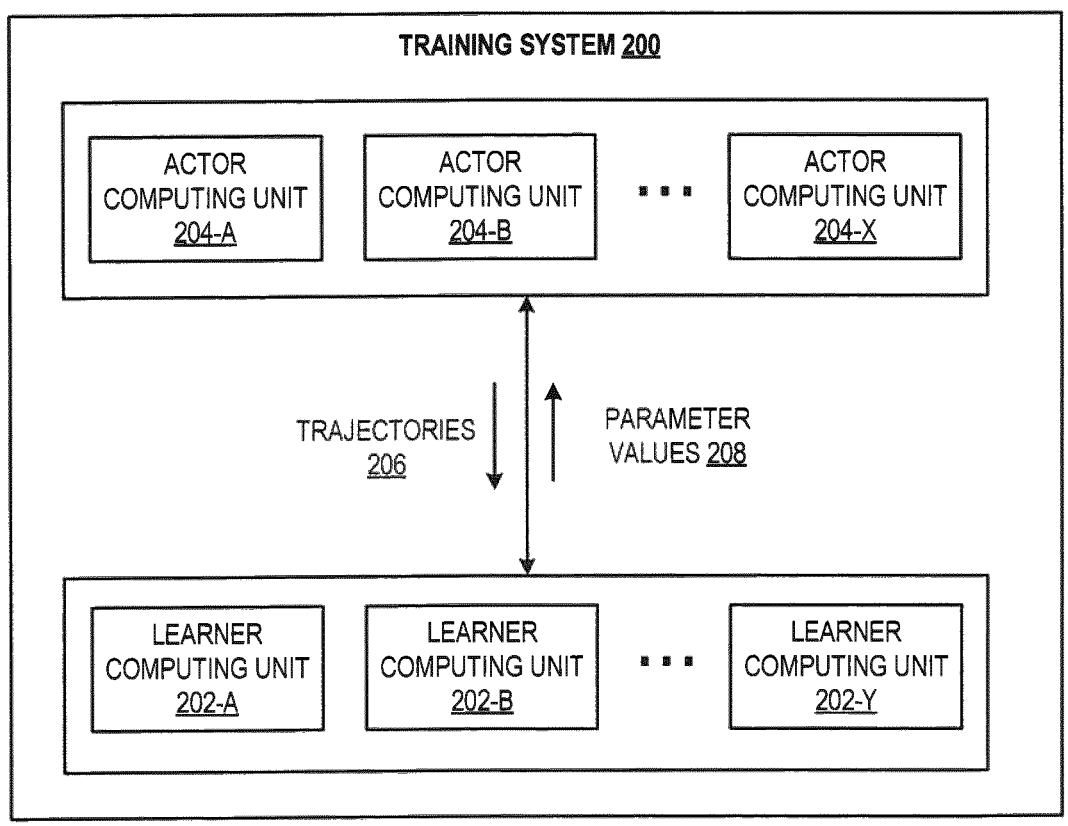
FIG. 2 shows an example training system.

FIG. 2 shows an example training system 200. The training system 200 is an example of a system implemented as computer programs on one or more computers in one or more locations in which the systems, components, and techniques described below are implemented.

The training system 200 is a distributed computing system which includes one or more learner computing units (e.g., 202-A, 202-B, . . . , 202-Y) and multiple actor computing units (e.g., 204-A, 204-B, . . . , 204-X). The learner computing units each maintain a respective "learner" action selection neural network, and the actor computing units each maintain a respective "actor" action selection neural network. Generally, the learner action selection networks and the actor action selection networks all have substantially the same neural network architecture. The learner computing units are configured to train a set of shared learner action selection network parameter values using reinforcement learning techniques based on trajectories of experience tuples generated by the actor computing units using the actor action selection networks.

A computing unit may be, e.g., a computer, a core within a computer having multiple cores, or other hardware or software, e.g., a dedicated thread, within a computer capable of independently perform operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, one computing unit may be a CPU while other computing units may be GPUs.

Each actor computing unit is configured generate trajectories of experience tuples that characterize the interaction of an agent with an instance of an environment by performing actions that are selected using the actor action selection network maintained by the actor computing unit. The actor computing units may provide the generated experience tuple trajectories 206 to the learner computing units by storing the experience tuple trajectories 206 in a data store that is accessible to each of the actor and learner computing units. For example, the data store may be a queue that maintains the experience tuple trajectories 206 in the order they were generated by the actor computing units.

Each of the learner computing units are configured to obtain "batches" (i.e., sets of one or more) experience tuple trajectories generated by the actor computing units, for example, by accessing the data store (e.g., queue) where the actor computing units store the generated experience tuple trajectories. After obtaining a batch of experience tuple trajectories, a learner computing unit uses a reinforcement learning technique to determine updates to the learner action selection network parameters based on the batch of experience tuple trajectories. The learner computing units can iteratively train the learner action selection network parameters based on multiple batches of experience tuple trajectories generated by the actor computing units. An example of a reinforcement learning system that implements a reinforcement learning technique that can be used to train the learner action selection network parameters is described with reference to FIG. 3.

While generating an experience tuple trajectory, an actor computing unit is configured to select the actions to be performed by the agent by processing observations in accordance with current values of the set of parameters of the actor action selection network maintained by the actor computing unit. The actor computing units can update the values of the actor action selection network parameters by obtaining the current learner action selection network parameters 208. For example, after generating a trajectory of experience tuples in accordance with the current values of the actor action selection network parameters, an actor computing unit may refrain from generating another experience tuple until it updates the actor action selection network parameters using the current learner action selection network parameters 208.

An actor computing unit can use the current values of the learner action selection network parameters to update the current values of its actor action selection network parameters in any appropriate manner. For example, the actor computing unit can replace the current values of its actor action selection network parameters with the current values of the learner action selection network parameters. As another example, the actor computing unit can replace the current values of its actor action selection network parameters by a linear combination of the current values of the actor action selection network parameters and the learner action selection network parameters. The weighting factors of the linear combination may be hyper-parameters of the training system 200.

The actor computing units may generate experience tuple trajectories using a different action selection policy (i.e., as defined by the parameter values of the actor action selection networks) than the action selection policy defined by the learner action selection network parameter values. For example, an actor computing unit may update the current values of the actor selection network parameters using the current learner action selection network parameter values, and thereafter generate an experience tuple trajectory using the updated actor selection network parameters. However, prior to a learner computing unit obtaining the experience tuple trajectory, the current learner action selection network parameter values may have been updated by the learner computing units. Therefore, the reinforcement learning technique used to train the learner action selection network parameter values may be an "off-policy" training technique, that is, a training technique that accounts for potential differences between the action selection policies of the actor computing units and the action selection policy defined by the learner action selection network parameter values. An example of an off-policy reinforcement learning technique that can be used to train the learner action selection network parameter values is described in more detail below, for example, with reference to FIG. 4.

Generally, determining an update to the learner action selection network parameter values based on a batch of experience tuple trajectories requires that some or all of the observations included in each experience tuple trajectory be processed using the learner action selection network parameter values (i.e., to generate respective policy scores corresponding to the observations). Rather than consecutively processing the observations included in each experience tuple, a learner computing unit can use a learner action selection network (or a state value network) to process the observations in parallel. More specifically, for each layer (e.g., convolutional layer, fully-connected layer, or recurrent layer) of the learner action selection network, the inputs to the layer for each of the observations may be processed in parallel to generate the layer outputs for each of the observations. In some cases, using the learner action selection network to process multiple observations in parallel can implemented substantially more efficiently than using the learner action selection network to consecutively process multiple observations. In contrast, in some conventional system, each computing unit performs both acting and learning, that is, each computing unit is configured to iteratively: (i) generate an experience tuple trajectory, and (ii) determine parameter value updates using an on-policy reinforcement learning technique. These conventional systems may be unable to parallelize as many operations as the learner computing units described in this specification (e.g., because they process one experience tuple trajectory at a time rather than in batches), and may therefore have a lower data throughput rate.

Different actor computing units may generate experience tuple trajectories that characterize the interaction of an agent with instances of different environments. For example, the environments corresponding to different actor computing units may generate rewards that characterize the progress of the agent towards accomplishing different tasks. In this example, the learner computing units can use the experience tuple trajectories generated by the actor computing units to train the learner action selection network parameter values to select actions that enable an agent to perform each of multiple tasks. For example, the learner action selection network parameter values may be used by a robotic agent in an industrial manufacturing environment to select actions to perform multiple tasks which each correspond to the assembly of different manufactured products.

When the training system 200 includes multiple learner computing units, the training system 200 can use appropriate distributed optimization procedure (e.g., distributed stochastic gradient descent) to train the learner action selection network parameter values. For example, the training system 200 can use an asynchronous or a synchronous optimization procedure to train the learner action selection network parameter values. In an asynchronous optimization procedure, the learner computing units operate independently of one another in determining updates to the learner action selection network parameter values. In a synchronous optimization procedure, at each of multiple training iterations, the learner computing units determine parameter updates based on the current learner action selection network parameter values. The parameter updates generated by each of the learner computing units are jointly applied to the learner action selection network parameter values at the end of the training iteration. An example synchronous distributed optimization procedure is described with reference to: J. Chen et al., "Revisiting distributed synchronous SGD", arXiv: 1604.00981v3, 2017.

The actor computing units and the learner computing units included in the training system 200 can be positioned in any appropriate locations and may communicate with one another (e.g., by sharing experience tuple trajectories) over any appropriate wired or wireless communication medium. The learner action selection network parameter values may be stored in any appropriate location (in some cases, remotely from the learner computing units).

Figure 3:
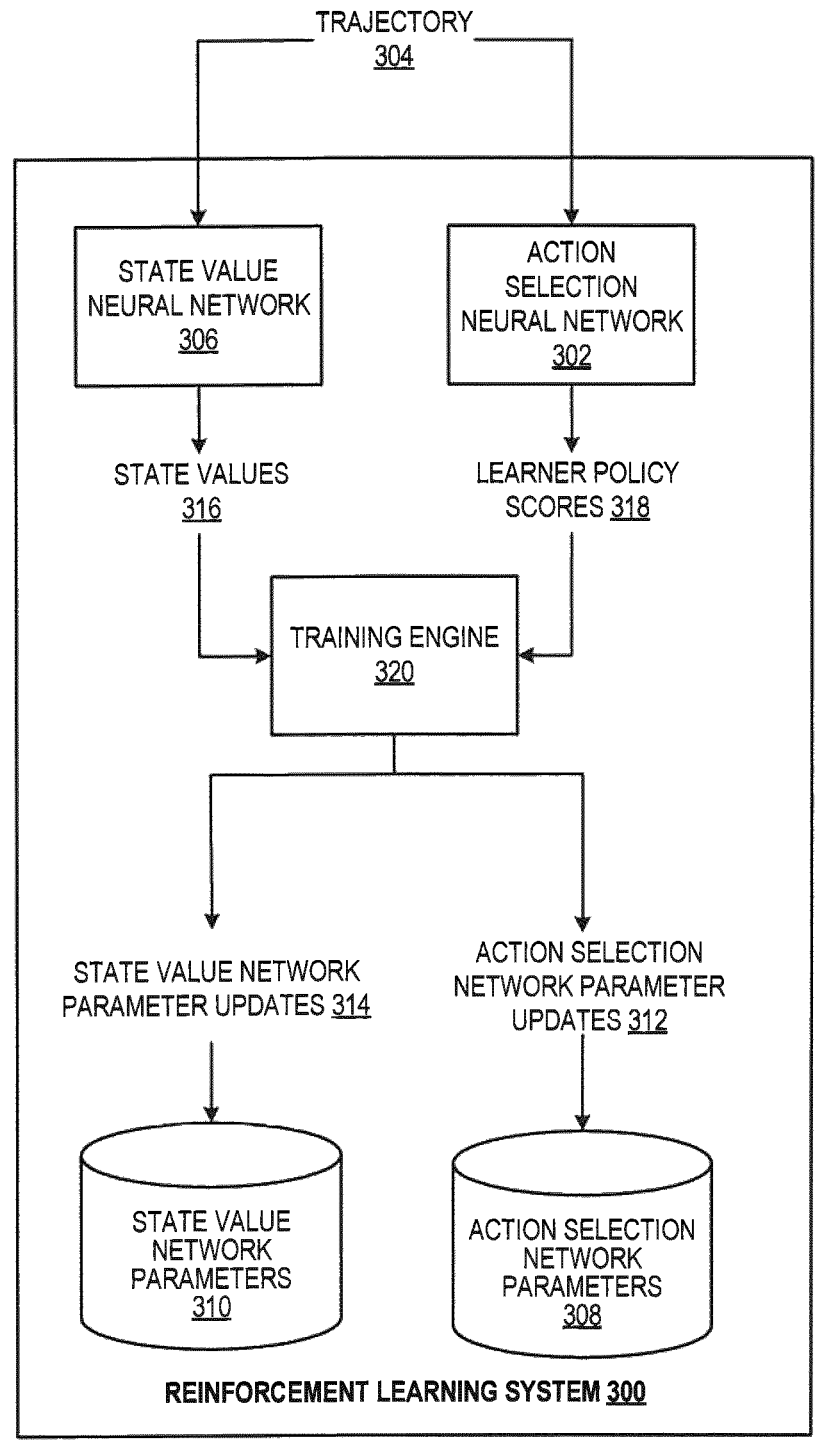
FIG. 3 shows an example reinforcement learning system.

FIG. 3 shows an example reinforcement learning system 300. The reinforcement learning system 300 is an example of a system implemented as computer programs on one or more computers in one or more locations in which the systems, components, and techniques described below are implemented.

The reinforcement learning system 300 is configured to train an action selection network 302 based on experience tuple trajectories 304 using reinforcement learning techniques. More specifically, the system 300 trains the action selection network 302 in tandem with a state value network 306 using an off-policy actor-critic reinforcement learning technique. As described earlier, the actor-critic reinforcement learning technique is referred to as "off-policy" because it accounts for potential differences between the action selection policy used to generate the experience tuple trajectories 304 and the action selection policy defined by the current parameter values of the action selection network 302.

The action selection network 302 is configured to process an input which includes an observation that characterizes the state of an environment to generate an output that includes respective policy scores (referred to herein as "learner" policy scores) for each action in a predetermined set of actions. The state value network 306 is configured to process an input which includes an observation that characterizes the state of the environment to generate an output that includes a "state value" for the observation. The state value for an observation is an estimate of the cumulative reward that will be received from the environment if the agent interacts with the environment by performing actions selected in accordance with the current values of the action selection network parameters 308. For example, the cumulative reward may be an estimate of a long-term time-discounted sum of future rewards that will be received from the environment if the agent interacts with the environment by performing actions selected in accordance with the current values of the action selection network parameters.

The action selection network 302 and the state value network 306 can be implemented by any appropriate neural network architectures, for example, neural network architectures which include one or more of: convolutional layers, fully-connected layers, or recurrent layers. In some cases, the action selection network 302 and the state value network 306 may be implemented by a common neural network architecture, with a first output layer that generates learner policy scores and a second output layer that generates state values.

Generally, the system 300 trains the action selection network 302 and the state value network 306 over multiple training iterations by iteratively updating the values of the action selection network parameters 308 and the state value network parameters 310. At each training iteration, the system 300 may determine action selection network parameter updates 312 and state value network parameter updates 314 based on a respective batch of experience tuple trajectories 304. For convenience, the description which follows refers to the system 300 as processing a given experience tuple trajectory 304 at a given training iteration.

The system 300 may obtain the experience tuple trajectory 304 in any appropriate manner. For example, the system 300 may obtain the experience tuple trajectory 304 from a data store which includes multiple experience tuple trajectories generated by actor computing units, as described with reference to FIG. 2. In some cases, the system 300 may randomly sample the experience tuple trajectory 304 from the data store (e.g., in accordance with a prioritized replay sampling technique). In some cases, if the data store is a queue that stores experience tuple trajectories in the order in which they were generated, the system 300 may obtain the most recently generated experience tuple trajectory from the queue.

The selected actions included in the experience tuple trajectory 304 were selected in accordance with an action selection policy that may be different than the action selection policy defined by the current values of the action selection network parameters 308. The action selection policy that was used to select the actions of the experience tuple trajectory 304 is referred to herein as a "behavior" policy. Each experience tuple in the trajectory 304 includes a respective "behavior" policy score that was assigned to the selected action of the experience tuple when the action was selected. For example, the behavior policy score may have been assigned to the selected action of the experience tuple when the observation of the experience tuple was processed by an actor action selection network to generate respective policy scores for a set of possible actions.

To generate the state value network parameter updates 314 and the action selection network parameter updates 312, the system 300 processes the observations included in the trajectory 304 using the state value network 306 and the action selection network 302 to generate state values 316 and learner policy scores 318. In particular, the system 300 generates a respective state value 316 for each observation included in the trajectory 304 and a respective learner policy score 318 for each selected action included in the trajectory 304. Thereafter, a training engine 320 generates the state value network parameter updates 314 and the action selection network parameter updates 312 from the state values 316 and the learner policy scores 318. In generating the state value network parameter updates 314 and the action selection network parameter updates 312, the training engine 320 takes into account the potential discrepancies between the learner policy scores 318 and the behavior policy scores of the selected actions included in the trajectory 304.

To determine the state value network parameter updates 314, the training engine 320 determines a state value target which defines the state value that should be generated by the state value network 306 by processing the observation included in the first experience tuple in the trajectory 304. The training system 200 can determine state value network parameter updates 314 which encourage the state value network 306 to generate a state value (i.e., by processing the observation included in the first experience tuple in the trajectory 304) which is more similar to the state value target. For example, the training system 200 can determine the state value parameter network updates 314 based on a gradient of a loss function that characterizes a discrepancy between the state value target and the corresponding state value generated by the state value network. The training engine 320 can determine the action selection network parameter updates 312 based in part on the gradient of the learner policy score 318 for the selected action included in the first experience tuple in the trajectory 304 with respect to the action selection network parameters. An example process for adjusting the current parameter values of the action selection network 302 and the state value network 306 is described in more detail with reference to FIG. 4.

Figure 4:
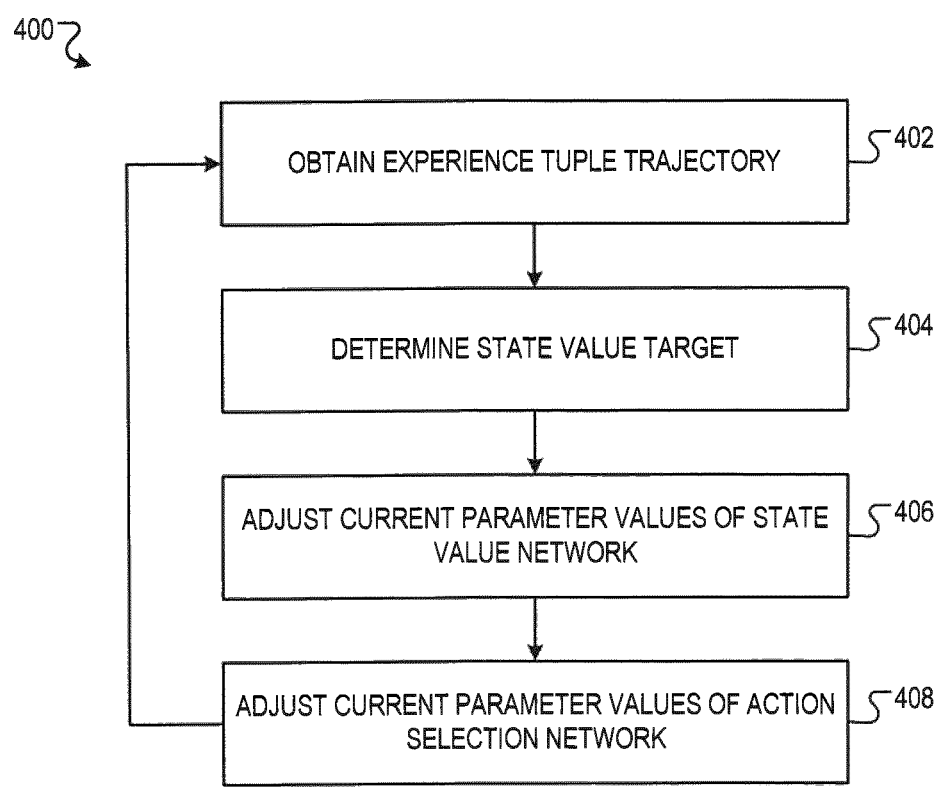
FIG. 4 is a flow diagram of an example of an iterative process for training an action selection network and a state value network using an off-policy actor-critic reinforcement learning technique.

FIG. 4 is a flow diagram of an example of an iterative process 400 for training an action selection network and a state value network using an off-policy actor-critic reinforcement learning technique. For convenience, the process 400 will be described as being performed by a system of one or more computers located in one or more locations. For example, a reinforcement learning system, e.g., the reinforcement learning system 300 of FIG. 3, appropriately programmed in accordance with this specification, can perform the process 400.

The system obtains an experience tuple trajectory (402). The experience tuple trajectory characterizes the interaction of an agent with an instance of an environment over a sequence of one or more time steps and includes a respective experience tuple corresponding to each time step. Each experience tuple includes: (i) an observation characterizing the state of the instance of the environment at a time step, (ii) an action that was selected to be performed by the agent at the time step using a behavior policy, (iii) a behavior policy score assigned to the selected action by the behavior policy when the action was selected, (iv) a subsequent observation characterizing a subsequent state of the environment instance subsequent to the agent performing the selected action, and (iv) a reward received subsequent to the agent performing the selected action.

The behavior policy can be any appropriate policy that selects actions to be performed by the agent interacting with the instance of the environment by assigning a respective behavior policy score to each action in a set of actions that can be performed by the agent. For example, the experience tuple trajectory may be generated by an actor computing unit (as described with reference to FIG. 2), and the behavior policy may be defined by the current parameter values of the actor action selection network.

For convenience, each iteration of the process 400 is described with reference to one experience tuple trajectory. In some cases, rather than obtaining one experience tuple trajectory, the system obtains a batch of multiple experience tuple trajectories and performs the steps of the process 400 for each of the experience tuple trajectories.

The system processes the experience tuple trajectory to determine a state value target which defines the state value that should be generated by a state value network by processing the observation included in the first experience tuple in the trajectory (404). The system determines the state value target using correction factors that account for potential differences between the behavior policy used to select the actions of the experience tuple trajectory and the action selection policy defined by the current values of the action selection network parameters. An example process for determining a state value target is described with reference to FIG. 5.

The system adjusts the current parameter values of the state value network based on the state value target (406). The system may adjust the current parameter values of the state value network to encourage the state value network to generate a state value for the observation included in the first experience tuple in the trajectory which is more similar to the state value target. For example, the system may adjust the current parameter values of the state value network using a gradient of a loss function that depends on the state value target. The system may determine the gradient of the loss function with respect to the current parameter values of the state value network using any appropriate technique, for example, backpropagation. The loss function may be, for example, a squared loss between the state value target and the state value generated by the state value network for the observation included in the first experience tuple in the trajectory. The system can use any appropriate gradient descent update rule to adjust the current parameter values of the state value network using the gradient of the loss function, for example, the gradient descent update rule defined by the Adam or RMSprop gradient descent algorithms.

The system adjusts the current parameter values of the action selection network (408). The system may adjust the current parameter values of the action selection network based on the gradient of the learner policy score for the selected action included in the first experience tuple with respect to the current parameter values of the action selection network. The learner policy score for the selected action included in the first experience tuple refers to the score assigned to the selected action by the learner policy scores generated by the action selection network for the observation included in the first experience tuple. The system can determine the gradient of the learner policy score using any appropriate method, for example, backpropagation. The system can scale the gradient of the learner policy score using one or more scaling terms, as will be described in more detail below, and thereafter can use any appropriate gradient descent update rule to adjust the current parameter values of the action selection network based on the gradient. For example, the system can adjust the current parameter values of the action selection network using the gradient descent update rule defined by the Adam or RMSprop gradient descent algorithms.

In some cases, the system scales the gradient of the learner policy score by a scaling term based on a ratio of the learner policy score and the behavior policy score for the selected action from the first experience tuple in the trajectory. Alternatively or in combination, the system may scale the gradient of the learner policy score by a scaling term based on state values generated by the state value network for one or more experience tuples included in the experience tuple trajectory. Alternatively or in combination, the system may scale the gradient of the learner policy score by a scaling term based on a state value target for an observation that is included in an experience tuple that is after the first experience tuple in the experience tuple trajectory. An example process for determining a state value target is described with reference to FIG. 5. In a particular example, the system may adjust the current parameter values of the action selection network by gradient descent e.g. using a scaled gradient of the learner policy score for the selected action included in the first experience tuple that is given by:

$$\min\left(\bar{\rho}, \frac{\pi(a)}{\mu(a)}\right) \cdot \nabla \log(\pi(a)) \cdot (r + \gamma \cdot v - V(x)) \quad (1)$$

where $\bar{\rho}$ is a predetermined truncation value, $\pi(a)$ is the learner policy score for the selected action from the first experience tuple in the trajectory, $\mu(a)$ is the behavior policy score for the selected action from the first experience tuple in the trajectory, $\nabla \pi(a)$ is the gradient of the learner policy score for the selected action from the first experience tuple in the trajectory with respect to the parameters of the action selection network, r is the reward from the first experience tuple in the trajectory, $\gamma$ is a constant discount factor, v is the state value target for the observation that is included in the second experience tuple in the trajectory, and V(x) is the state value for the observation from the first experience tuple in the trajectory.

Optionally, the system may adjust the current values of the action selection network parameters using a gradient of an entropy bonus with respect to the values of the action selection network parameters. The entropy bonus may characterize how evenly the learner policy scores generated by the action selection network for the observation included in the first experience tuple in the experience tuple trajectory are distributed over the set of possible actions. For example, the entropy bonus may be given by:

$$-\sum_{a \in A} \pi(a) \cdot \log(\pi(a)) \quad (2)$$

Where A represents the set of possible actions and $\pi(a)$ represents the learner policy score for action a. Adjusting the current values of the action selection network parameters using the gradient of an entropy bonus may prevent premature convergence of the action selection network parameters during training.

When the system processes a batch of multiple experience tuple trajectories at each training iteration (i.e., rather than one experience tuple trajectory), the system may determine respective updates to the parameter values of the action selection network and the state value network for each experience tuple trajectory. Thereafter, the system can adjust the values of the action selection network parameters and the state value network parameters using, for example, an average of the parameter value updates determined for each of the experience tuple trajectories.

After adjusting the current parameter values of the action selection network and the state value network, the system can determine whether a training termination criterion is met. For example, the system may determine that a training termination criterion is met if the system has performed a predetermined number of training iterations. As another example, the system may determine that a training termination criterion is met if the performance of an agent in completing one or more tasks using the current values of the action selection network parameters satisfies a threshold. In response to determining that a training termination criterion is not met, the system returns to step 402 and repeats the preceding steps. In response to determining that a training termination criterion is met, the system can output the trained values of the action selection network parameters (and optionally, the state value network parameters).

Figure 5:
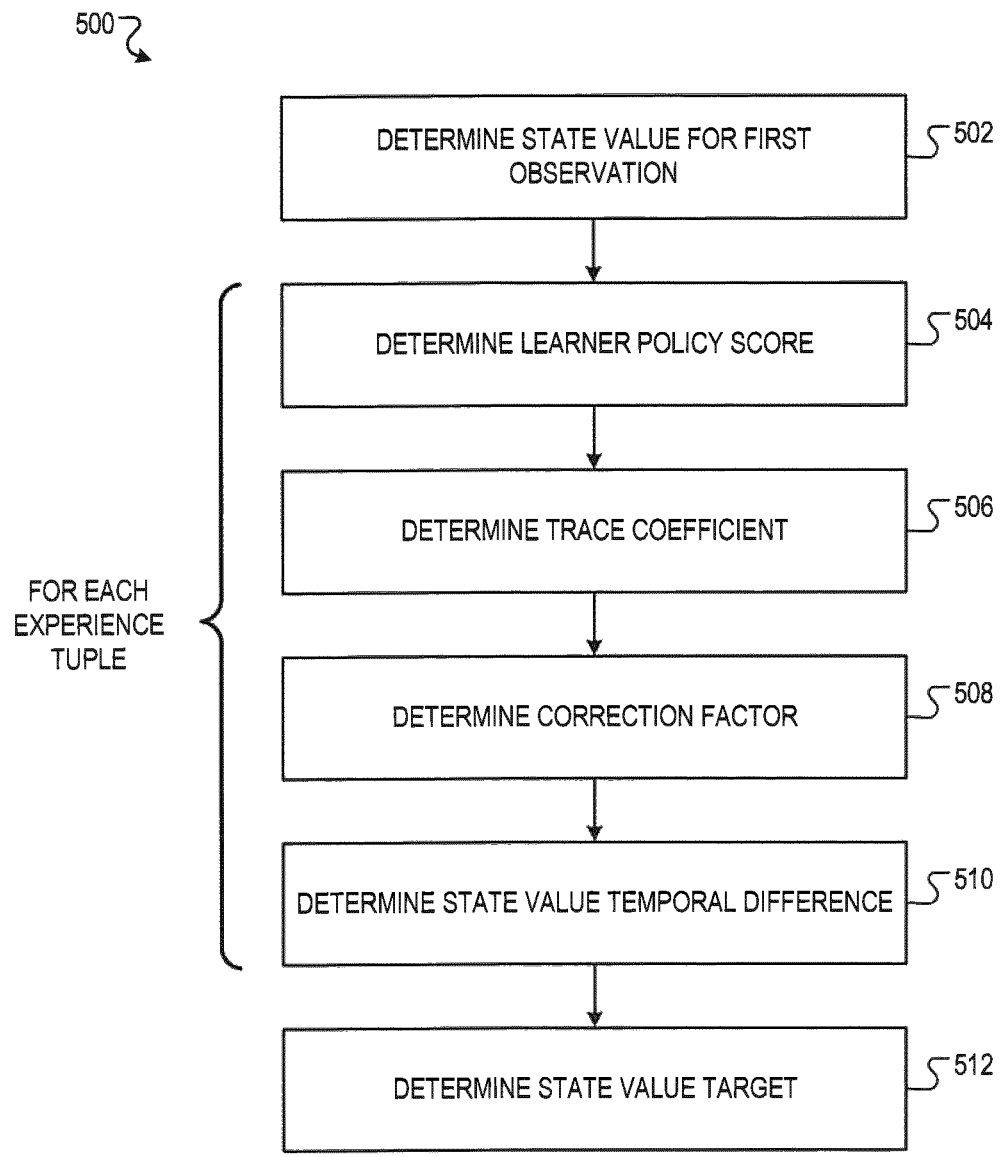
FIG. 5 is a flow diagram of an example process for determining a state value target for a state value network.

FIG. 5 is a flow diagram of an example process 500 for determining a state value target for a state value network based on an experience tuple trajectory. For convenience, the process 500 will be described as being performed by a system of one or more computers located in one or more locations. For example, a reinforcement learning system, e.g., the reinforcement learning system 300 of FIG. 3, appropriately programmed in accordance with this specification, can perform the process 500.

The system determines a state value for the observation included in the first experience tuple in the trajectory (502). For example, the system may determine the state value by processing the observation included in the first experience tuple in the trajectory using the state value network and in accordance with current values of the state network parameters.

The system performs the steps 504-510 (described below) for each experience tuple in the trajectory. For convenience, the steps 504-510 are described with reference to a given experience tuple in the trajectory.

The system determines a learner policy score for the selected action included in the given experience tuple (504). For example, the system may process the observation included in the given experience using the action selection network, in accordance with the current values of the action selection network parameters, to generate an output which defines a learner policy score for the selected action included in the given experience tuple.

The system determines a trace coefficient for the given experience tuple based on a ratio of the learner policy score and the behavior policy score for the selected action included in the given experience tuple (506). For example, the system can determine the trace coefficient for the given experience tuple as:

$$\frac{\pi(a)}{\mu(a)} \quad (3)$$

where $\pi(a)$ is the learner policy score for the selected action and $\mu(a)$ is the behavior policy score for the selected action. In some implementations, the system may scale the trace coefficient by a predetermined scaling factor.

The system determines a correction factor for the given experience tuple based on: (i) the trace coefficient for the given experience tuple, and (ii) the trace coefficients for any experience tuples that precede the given experience tuple in the trajectory (508). For example, the system may determine the correction factor as a product of the trace coefficient for the given experience tuple and the trace coefficients for any experience tuples that precede the given experience tuple in the trajectory. In some cases, in determining the correction factor for the given experience tuple, the system truncates the trace coefficient for the given experience tuple at a first truncation value and truncates the trace coefficients for any experience tuples that precede the given experience tuple at a second truncation value. The first truncation value may be greater than or equal to the second truncation value. For example, the system may determine the correction factor for the experience tuple as:

$$C_t = \min\left(\bar{\rho}, \frac{\pi(a_t)}{\mu(a_t)}\right) \cdot \prod_{i=0}^{t-1}\left(\min\left(\bar{c}, \frac{\pi(a_i)}{\mu(a_i)}\right)\right) \quad (4)$$

where t indexes the given experience tuple in the sequence of experience tuples, $\bar{\rho}$ is the first truncation value, $\bar{c}$ is the second truncation value, $\pi(a_i)$ is the learner policy score for the selected action of the i-th experience tuple, and $\mu(a_i)$ is the behavior policy score for the selected action of the i-th experience tuple.

The system determines a state value temporal difference for the experience tuple; this may represent a difference between the state values of the observation and subsequent observation in the experience tuple. More particularly the state value temporal difference may be based on at least: (i) the reward included in the given experience tuple, and (ii) respective state values for the observation and the subsequent observation included in the given experience tuple (510). The system may determine the respective states values by processing the observation and the subsequent observation included in the given experience tuple using the state value network, in accordance with current values of the state value network parameters. For example, the system may determine the state value temporal difference for the given experience tuple as:

$$\delta_t V = r_t + \gamma \cdot V(x_{t+1}) - V(x_t) \quad (5)$$

where $r_t$ is the reward included in the given experience tuple, $\gamma$ is a discount factor, $V(x_{t+1})$ is the state value for the subsequent observation included in the given experience tuple, and $V(x_t)$ is the state value for the observation included in the given experience tuple.

The system determines the state value target for the experience tuple trajectory based on at least: (i) the correction factors, (ii) the state value temporal differences, and (iii) the state value for the observation included in the first experience tuple in the trajectory (512). For example, the system may determine the state value target for the experience tuple trajectory as:

$$v = V(x_0) + \sum_{t=0}^{n-1} \gamma^t \cdot C_t \cdot \delta_t V \quad (6)$$

where $V(x_0)$ is the state value for the observation included in the first experience tuple in the trajectory, n is the total number of experience tuples in the trajectory, t indexes the experience tuples in the trajectory, $\gamma$ is a discount factor, $C_t$ is the correction factor for the t-th experience tuple, and $\delta_t V$ is the state value temporal difference for the t-th experience tuple.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for training an action selection neural network used to select actions to be performed by an agent interacting with an environment, wherein the action selection neural network is configured to process an input comprising an observation of the environment in accordance with current parameter values of the action selection neural network to generate an output comprising respective learner policy scores for each action in a predetermined set of actions that can be performed by the agent, the method comprising:

obtaining a sequence of one or more experience tuples wherein each experience tuple comprises: (i) an observation characterizing a state of an instance of the environment at a respective time step, (ii) an action that was selected to be performed by the agent at the respective time step using a behavior policy, (iii) a behavior policy score assigned to the selected action by the behavior policy when the action was selected, (iv) a subsequent observation characterizing a subsequent state of the environment instance subsequent to the agent performing the selected action, and (iv) a reward received subsequent to the agent performing the selected action;

adjusting current parameter values of a state value neural network, wherein the state value neural network is configured to process an input comprising an observation of the environment in accordance with current parameter values of the state value neural network to generate an output comprising a state value for the observation, the adjusting including:

determining, using the state value neural network, in accordance with current parameter values of the state value neural network, and based on the observation included in the first experience tuple in the sequence, a state value for the observation included in the first experience tuple in the sequence;

for each experience tuple of the sequence of experience tuples:

determining, using the action selection neural network, in accordance with current parameter values of the action selection neural network, and based on the observation included in the experience tuple, a learner policy score for the selected action from the experience tuple;

determining a trace coefficient based on a ratio of the learner policy score for the selected action and the behavior policy score for the selected action;

determining a correction factor for the experience tuple based on: (i) the trace coefficient for the experience tuple, and (ii) the trace coefficients for any experience tuples that precede the experience tuple in the sequence;

determining a state value temporal difference for the experience tuple based on at least: (i) the reward included in the experience tuple, (ii) a state value for the observation included in the experience tuple generated by processing the observation included in the experience tuple in accordance with current parameter values of the state value neural network, and (iii) a state value for the subsequent observation included in the experience tuple generated by processing the subsequent observation included in the experience tuple in accordance with current parameter values of the state value neural network;

determining a state value target for the observation included in the first experience tuple in the sequence based on at least: (i) the correction factors, (ii) the state value temporal differences, and (iii) the state value for the observation included in the first experience tuple in the sequence;

determining a gradient of a state value loss function with respect to parameters of the state value neural network, wherein the state value loss function is based on at least the state value target; and adjusting the current parameter values of the state value neural network based on the gradient; and adjusting current parameter values of the action selection neural network based at least on: (i) a ratio of the learner policy score and the behavior policy score for the selected action from the first experience tuple of the sequence, and (ii) state values generated by the state value neural network by processing observations included in one or more experience tuples in accordance with current parameter values of the state value neural network.

2. The method of claim 1, wherein determining the correction factor for the experience tuple comprises:
truncating the trace coefficient for the experience tuple at a first truncation value; and
truncating the trace coefficients for any experience tuples that precede the experience tuple in the sequence at a second truncation value.

3. The method of claim 2, wherein the first truncation value is greater than or equal to the second truncation value.

4. The method of claim 1, wherein determining the correction factor for the experience tuple comprises:
scaling the trace coefficients by a predetermined scale factor.

5. The method of claim 1, wherein determining the correction factor for the experience tuple comprises:
determining a product of: (i) the trace coefficient for the experience tuple and (ii) the trace coefficients for any experience tuples that precede the experience tuple in the sequence.

6. The method of claim 1, wherein determining a state value temporal difference for the experience tuple comprises adding: (i) the reward included in the experience tuple, (ii) a product of a discount factor and the state value for the subsequent observation included in the experience tuple, and (iii) a negative of the state value for the observation included in the experience tuple.

7. The method of claim 1, wherein determining a state value target comprises:
determining a discounted sum, over the sequence of experience tuples, of a product of: (i) the correction factor for the experience tuple and (ii) the state value temporal difference for the experience tuple, and
adding the state value for the observation included in the first experience tuple to the discounted sum.

8. The method of claim 1, wherein the state value loss function comprises a squared loss between the state value target and the state value for the observation included in the first experience tuple in the sequence.

9. The method of claim 1, wherein adjusting the current parameter values of the action selection neural network based on a ratio of the learner policy score and the behavior policy score for the selected action comprises:
truncating the ratio at a predetermined value.

10. The method of claim 1, wherein adjusting the current parameter values of the action selection neural network is further based on at least:
- a gradient of the learner policy score for the selected action included in the first experience tuple in the sequence; and
- a state value target for an observation included in a later experience tuple that is after the first experience tuple in the sequence, wherein the state value target for the observation included in the later experience tuple is based on at least: (i) correction factors for the later experience tuple and subsequent experience tuples, (ii) state value temporal differences for the later experience tuple and subsequent experience tuples, and (iii) a state value for the observation included in the later experience tuple in the sequence; and
- rewards included in one or more experience tuples of the sequence.

11. The method of claim 1, further comprising:
- determining an entropy bonus, including determining a sum, over each action of the predetermined set of actions, of a product of: (i) a learner policy score for the action from the action selection neural network based on the observation included in the first experience tuple, and (ii) a logarithm of the learner policy score for the action from the action selection neural network based on the observation included in the first experience tuple; and
- adjusting the current parameter values of the action selection neural network further based on at least a gradient of the entropy bonus with respect to parameters of the action selection neural network.

12. The method of claim 1, wherein the behavior policy is different than the learner policy defined by the action selection neural network.

13. A system for training a learner action selection neural network used to select actions to be performed by an agent interacting with an environment in accordance with learner action selection neural network parameters, the system comprising:
- a plurality of actor computing units, each of the actor computing units configured to maintain a respective actor action selection neural network and to perform actor operations comprising:
  - generating a trajectory of one or more experience tuples, wherein generating an experience tuple comprises:
    - receiving an observation characterizing a current state of an instance of the environment,
    - determining, using the actor action selection neural network, in accordance with current parameter values of the actor action selection neural network, and based on the observation, a selected action to be performed by the agent and a policy score for the selected action;
    - obtaining transition data including: (i) a subsequent observation characterizing a subsequent state of the environment instance subsequent to the agent performing the selected action and (ii) a reward received subsequent to the agent performing the selected action;
    - generating an experience tuple from the observation, the selected action, the policy score for the selected action, the subsequent observation, and the reward;
  - storing the trajectory of experience tuples in a queue, wherein the queue is accessible to each of the actor computing units, and the queue comprises an ordered sequence of different experience tuple trajectories; and
- one or more learner computing units, wherein each of the one or more learner computing units is configured to perform learner operations comprising:
  - obtaining a batch of experience tuple trajectories from the queue; and
  - determining, using the batch of experience tuple trajectories, an update to the learner action selection neural network parameters using a reinforcement learning technique.

14. The system of claim 13, wherein each actor computing unit performs actor operations further comprising updating the current parameter values of the actor action selection neural network, including:
- obtaining current parameter values of the learner action selection neural network; and
- updating the current parameter values of the actor action selection neural network based on the current learner action selection neural network parameter values.

15. The system of claim 14, wherein each actor computing unit, after generating an experience tuple trajectory, refrains from generating additional experience tuple trajectories before updating the current parameter values of the actor action selection neural network.

16. The system of claim 13, wherein:
- the learner action selection neural network includes one or more convolutional layers; and
- determining, using the batch of experience tuple trajectories, an update to the learner action selection neural network parameters comprises processing each observation from each experience tuple of each experience tuple trajectory in the batch using the learner action selection neural network, wherein:
  - for each convolutional layer of the learner action selection neural network, the inputs to the convolutional layer for each of the observations are processed in parallel to generate convolutional layer outputs for each of the observations.

17. The system of claim 13, wherein:
- the learner action selection neural network includes one or more fully-connected layers; and
- determining, using the batch of experience tuple trajectories, an update to the learner action selection neural network parameters comprises processing each observation from each experience tuple of each experience tuple trajectory in the batch using the learner action selection neural network, wherein:
  - for each fully-connected layer of the learner action selection neural network, the inputs to the fully-connected layer for each of the observations are processed in parallel to generate fully-connected layer outputs for each of the observations.

18. The system of claim 13, wherein:
- the learner action selection neural network includes one or more long short-term memory layers; and
- determining, using the batch of experience tuple trajectories, an update to the learner action selection neural network parameters comprises processing each observation from each experience tuple of each experience tuple trajectory in the batch using the learner action selection neural network, wherein:
  - for each long short-term memory layer of the learner action selection neural network, the inputs to the long short-term memory layer for each of the observations are processed in parallel to generate long short-term memory layer outputs for each of the observations.

19. The system of claim 13, wherein each experience tuple comprises: (i) an observation characterizing a state of an instance of the environment at a respective time step, (ii) an action that was selected to be performed by the agent at the respective time step using a behavior policy, (iii) a behavior policy score assigned to the selected action by the behavior policy when the action was selected, (iv) a subsequent observation characterizing a subsequent state of the environment instance subsequent to the agent performing the selected action, and (iv) a reward received subsequent to the agent performing the selected action; and wherein each of the one or more learner computing units is configured to perform learner operations comprising:

adjusting current parameter values of a state value neural network, wherein the state value neural network is configured to process an input comprising an observation of the environment in accordance with current parameter values of the state value neural network to generate an output comprising a state value for the observation, the adjusting including:

determining, using the state value neural network, in accordance with current parameter values of the state value neural network, and based on the observation included in the first experience tuple in the sequence, a state value for the observation included in the first experience tuple in the sequence;

for each experience tuple of the batch of experience tuples:

determining, using the learner action selection neural network, in accordance with current parameter values of the learner action selection neural network, and based on the observation included in the experience tuple, a learner policy score for the selected action from the experience tuple;

determining a trace coefficient based on a ratio of the learner policy score for the selected action and the behavior policy score for the selected action;

determining a correction factor for the experience tuple based on: (i) the trace coefficient for the experience tuple, and (ii) the trace coefficients for any experience tuples that precede the experience tuple in the sequence;

determining a state value temporal difference for the experience tuple based on at least: (i) the reward included in the experience tuple, (ii) a state value for the observation included in the experience tuple generated by processing the observation included in the experience tuple in accordance with current parameter values of the state value neural network, and (iii) a state value for the subsequent observation included in the experience tuple generated by processing the subsequent observation included in the experience tuple in accordance with current parameter values of the state value neural network;

determining a state value target for the observation included in the first experience tuple in the sequence based on at least: (i) the correction factors, (ii) the state value temporal differences, and (iii) the state value for the observation included in the first experience tuple in the sequence;

determining a gradient of a state value loss function with respect to parameters of the state value neural network, wherein the state value loss function is based on at least the state value target; and adjusting the current parameter values of the state value neural network based on the gradient; and determining the update to the learner action selection neural network parameters by adjusting current parameter values of the learner action selection neural network based at least on: (i) a ratio of the learner policy score and the behavior policy score for the selected action from the first experience tuple of the sequence, and (ii) state values generated by the state value neural network by processing observations included in one or more experience tuples in accordance with current parameter values of the state value neural network.

20. A system comprising:

one or more computers; and one or more storage devices communicatively coupled to the one or more computers, wherein the one or more storage devices store instructions that, when executed by the one or more computers, cause the one or more computers to perform operations for training an action selection neural network used to select actions to be performed by an agent interacting with an environment, wherein the action selection neural network is configured to process an input comprising an observation of the environment in accordance with current parameter values of the action selection neural network to generate an output comprising respective learner policy scores for each action in a predetermined set of actions that can be performed by the agent, the operations comprising:

obtaining a sequence of one or more experience tuples wherein each experience tuple comprises: (i) an observation characterizing a state of an instance of the environment at a respective time step, (ii) an action that was selected to be performed by the agent at the respective time step using a behavior policy, (iii) a behavior policy score assigned to the selected action by the behavior policy when the action was selected, (iv) a subsequent observation characterizing a subsequent state of the environment instance subsequent to the agent performing the selected action, and (iv) a reward received subsequent to the agent performing the selected action;

adjusting current parameter values of a state value neural network, wherein the state value neural network is configured to process an input comprising an observation of the environment in accordance with current parameter values of the state value neural network to generate an output comprising a state value for the observation, the adjusting including:

determining, using the state value neural network, in accordance with current parameter values of the state value neural network, and based on the observation included in the first experience tuple in the sequence, a state value for the observation included in the first experience tuple in the sequence;

for each experience tuple of the sequence of experience tuples:

determining, using the action selection neural network, in accordance with current parameter values of the action selection neural network, and based on the observation included in the experience tuple, a learner policy score for the selected action from the experience tuple;

determining a trace coefficient based on a ratio of the learner policy score for the selected action and the behavior policy score for the selected action;

determining a correction factor for the experience tuple based on: (i) the trace coefficient for the experience tuple, and (ii) the trace coefficients for any experience tuples that precede the experience tuple in the sequence;

determining a state value temporal difference for the experience tuple based on at least: (i) the reward included in the experience tuple, (ii) a state value for the observation included in the experience tuple generated by processing the observation included in the experience tuple in accordance with current parameter values of the state value neural network, and (iii) a state value for the subsequent observation included in the experience tuple generated by processing the subsequent observation included in the experience tuple in accordance with current parameter values of the state value neural network;

determining a state value target for the observation included in the first experience tuple in the sequence based on at least: (i) the correction factors, (ii) the state value temporal differences, and (iii) the state value for the observation included in the first experience tuple in the sequence;

determining a gradient of a state value loss function with respect to parameters of the state value neural network, wherein the state value loss function is based on at least the state value target; and adjusting the current parameter values of the state value neural network based on the gradient; and adjusting current parameter values of the action selection neural network based at least on: (i) a ratio of the learner policy score and the behavior policy score for the selected action from the first experience tuple of the sequence, and (ii) state values generated by the state value neural network by processing observations included in one or more experience tuples in accordance with current parameter values of the state value neural network.

21. One or more non-transitory computer storage media storing instructions that when executed by one or more computers cause the one or more computers to perform operations for training an action selection neural network used to select actions to be performed by an agent interacting with an environment, wherein the action selection neural network is configured to process an input comprising an observation of the environment in accordance with current parameter values of the action selection neural network to generate an output comprising respective learner policy scores for each action in a predetermined set of actions that can be performed by the agent, the operations comprising:

obtaining a sequence of one or more experience tuples wherein each experience tuple comprises: (i) an observation characterizing a state of an instance of the environment at a respective time step, (ii) an action that was selected to be performed by the agent at the respective time step using a behavior policy, (iii) a behavior policy score assigned to the selected action by the behavior policy when the action was selected, (iv) a subsequent observation characterizing a subsequent state of the environment instance subsequent to the agent performing the selected action, and (iv) a reward received subsequent to the agent performing the selected action;

adjusting current parameter values of a state value neural network, wherein the state value neural network is configured to process an input comprising an observation of the environment in accordance with current parameter values of the state value neural network to generate an output comprising a state value for the observation, the adjusting including:

determining, using the state value neural network, in accordance with current parameter values of the state value neural network, and based on the observation included in the first experience tuple in the sequence, a state value for the observation included in the first experience tuple in the sequence;

for each experience tuple of the sequence of experience tuples:

determining, using the action selection neural network, in accordance with current parameter values of the action selection neural network, and based on the observation included in the experience tuple, a learner policy score for the selected action from the experience tuple;

determining a trace coefficient based on a ratio of the learner policy score for the selected action and the behavior policy score for the selected action;

determining a correction factor for the experience tuple based on: (i) the trace coefficient for the experience tuple, and (ii) the trace coefficients for any experience tuples that precede the experience tuple in the sequence;

determining a state value temporal difference for the experience tuple based on at least: (i) the reward included in the experience tuple, (ii) a state value for the observation included in the experience tuple generated by processing the observation included in the experience tuple in accordance with current parameter values of the state value neural network, and (iii) a state value for the subsequent observation included in the experience tuple generated by processing the subsequent observation included in the experience tuple in accordance with current parameter values of the state value neural network;

determining a state value target for the observation included in the first experience tuple in the sequence based on at least: (i) the correction factors, (ii) the state value temporal differences, and (iii) the state value for the observation included in the first experience tuple in the sequence;

determining a gradient of a state value loss function with respect to parameters of the state value neural network, wherein the state value loss function is based on at least the state value target; and adjusting the current parameter values of the state value neural network based on the gradient; and adjusting current parameter values of the action selection neural network based at least on: (i) a ratio of the learner policy score and the behavior policy score for the selected action from the first experience tuple of the sequence, and (ii) state values generated by the state value neural network by processing observations included in one or more experience tuples in accordance with current parameter values of the state value neural network.

22. A method performed by one or more computers for training a learner action selection neural network used to select actions to be performed by an agent interacting with an environment in accordance with learner action selection neural network parameters, wherein the method comprises performing operations of a plurality of actor computing units and one or more learner computing units, wherein each of the actor computing units maintains a respective actor action selection neural network and performs actor operations comprising:

generating a trajectory of one or more experience tuples, wherein generating an experience tuple comprises:

receiving an observation characterizing a current state of an instance of the environment, determining, using the actor action selection neural network, in accordance with current parameter values of the actor action selection neural network, and based on the observation, a selected action to be performed by the agent and a policy score for the selected action;

obtaining transition data including: (i) a subsequent observation characterizing a subsequent state of the environment instance subsequent to the agent performing the selected action and (ii) a reward received subsequent to the agent performing the selected action;

generating an experience tuple from the observation, the selected action, the policy score for the selected action, the subsequent observation, and the reward;

storing the trajectory of experience tuples in a queue, wherein the queue is accessible to each of the actor computing units, and the queue comprises an ordered sequence of different experience tuple trajectories; and wherein each of the one or more learner computing units performs learner operations comprising:

obtaining a batch of experience tuple trajectories from the queue; and determining, using the batch of experience tuple trajectories, an update to the learner action selection neural network parameters using a reinforcement learning technique.

23. One or more non-transitory computer storage media storing instructions that when executed by one or more computers cause the one or more computers to perform operations for training a learner action selection neural network used to select actions to be performed by an agent interacting with an environment in accordance with learner action selection neural network parameters, wherein the method comprises performing operations of a plurality of actor computing units and one or more learner computing units, wherein each of the actor computing units maintains a respective actor action selection neural network and performs actor operations comprising:

generating a trajectory of one or more experience tuples, wherein generating an experience tuple comprises:

receiving an observation characterizing a current state of an instance of the environment, determining, using the actor action selection neural network, in accordance with current parameter values of the actor action selection neural network, and based on the observation, a selected action to be performed by the agent and a policy score for the selected action;

obtaining transition data including: (i) a subsequent observation characterizing a subsequent state of the environment instance subsequent to the agent performing the selected action and (ii) a reward received subsequent to the agent performing the selected action;

generating an experience tuple from the observation, the selected action, the policy score for the selected action, the subsequent observation, and the reward;

storing the trajectory of experience tuples in a queue, wherein the queue is accessible to each of the actor computing units, and the queue comprises an ordered sequence of different experience tuple trajectories; and wherein each of the one or more learner computing units performs learner operations comprising:

obtaining a batch of experience tuple trajectories from the queue; and determining, using the batch of experience tuple trajectories, an update to the learner action selection neural network parameters using a reinforcement learning technique.

\* \* \* \* \*

UNITED STATES PATENT AND TRADEMARK OFFICE
CERTIFICATE OF CORRECTION

Page 1 of 1

PATENT NO. : 11,593,646 B2
APPLICATION NO. : 16/767049
DATED : February 28, 2023
INVENTOR(S) : Hubert Josef Soyer et al.

It is certified that error appears in the above-identified patent and that said Letters Patent is hereby corrected as shown below:

In the Claims

Column 23, Line 25, and Claim number 1, after "and" delete "(iv)" and insert --(v)--

Signed and Sealed this
Seventh Day of October, 2025

John A. Squires
*Director of the United States Patent and Trademark Office*